US012633848B2

(12) United States Patent
Fukushima et al.

(10) Patent No.: US 12,633,848 B2
(45) Date of Patent: May 19, 2026

(54) MOTOR SYSTEM

(71) Applicant: Murata Machinery, Ltd., Kyoto (JP)

(72) Inventors: Daisuke Fukushima, Inuyama (JP);
Yoshiyuki Azuma, Inuyama (JP)

(73) Assignee: Murata Machinery, Ltd., Kyoto (JP)

( * ) Notice: Subject to any disclaimer, the term of this
patent is extended or adjusted under 35
U.S.C. 154(b) by 225 days.

(21) Appl. No.: 18/724,925

(22) PCT Filed: Nov. 25, 2022

(86) PCT No.: PCT/JP2022/043578
§ 371 (c)(1),
(2) Date: Jun. 27, 2024

(87) PCT Pub. No.: WO2023/127365
PCT Pub. Date: Jul. 6, 2023

(65) Prior Publication Data
US 2025/0070691 A1      Feb. 27, 2025

(30) Foreign Application Priority Data
Dec. 27, 2021    (JP) ................................. 2021-213561

(51) Int. Cl.
*H02P 6/04*          (2016.01)
*H02P 5/50*          (2016.01)
(52) U.S. Cl.
CPC ...................................... *H02P 5/50* (2013.01)
(58) Field of Classification Search
CPC ...................................... H02P 5/50; H02P 5/74
See application file for complete search history.

(56) References Cited

U.S. PATENT DOCUMENTS

| | | | |
|---|---|---|---|
| 2013/0229134 A1 | 9/2013 | Sato | |
| 2014/0097859 A1* | 4/2014 | Matsumura | ......... H02P 29/0241 |
| | | | 324/750.01 |
| 2015/0303841 A1 | 10/2015 | Suzuki et al. | |

FOREIGN PATENT DOCUMENTS

| | | |
|---|---|---|
| JP | 2007-288964 | 11/2007 |
| JP | 2015-208083 | 11/2015 |
| JP | 2018-102129 | 6/2018 |
| WO | 2012/056842 | 5/2012 |

OTHER PUBLICATIONS

International Search Report dated Jan. 24, 2023, of counterpart
International Application No. PCT/JP2022/043578, along with an
English translation.

* cited by examiner

*Primary Examiner* — Muhammad S Islam
(74) *Attorney, Agent, or Firm* — DLA Piper LLP (US)

(57)          ABSTRACT

A motor driver supplies electric power to a plurality of
motors. A switcher selectively switches a target motor to
which the electric power output from the motor driver is
supplied among the plurality of motors. An output controller
includes a plurality of motor controllers, each of which
performs control on any one of the plurality of motor, and
controls the motor driver so that the motor driver outputs the
electric power based on an output from each of the plurality
of motor controllers. A switching controller controls the
switcher so that the target motor is cyclically switched
among an equal or fewer number of motors out of the
plurality of motors compared to a number of the plurality of
motor controllers.

7 Claims, 4 Drawing Sheets

100

FIG. 3 controller switching controller assigner 4

Figure 3:
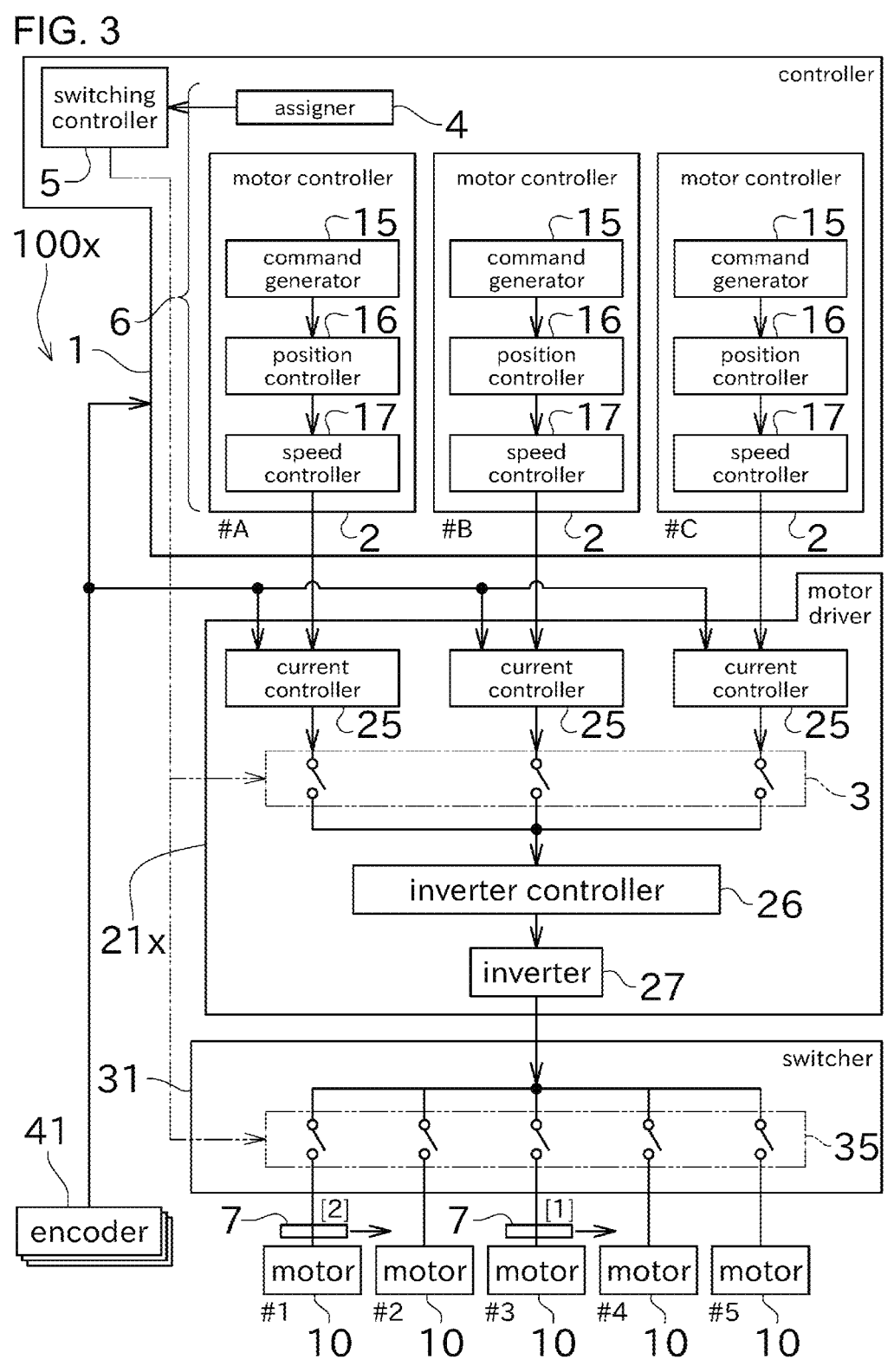

5

100x

1

6 motor controller 15
command generator 16
position controller 17
speed controller

A    2 motor controller 15
command generator 16
position controller 17
speed controller

B    2 motor controller 15
command generator 16
position controller 17
speed controller

C    2 motor driver current controller
25 current controller
25 current controller
25

3

21x inverter controller    26 inverter    27 switcher

31

41

35 encoder

7    [2]

7    [1]

motor
1
10 motor
2
10 motor
3
10 motor
4
10 motor
5
10

MOTOR SYSTEM

CROSS REFERENCE TO RELATED APPLICATIONS

This application is a US national stage filing under 35 U.S.C. § 371 of International Application No. PCT/JP2022/043578 filed Nov. 25, 2022, which claims priority to Japanese Patent Application No. 2021-213561, filed Dec. 27, 2021, each of which is incorporated herein by reference in its entirety.

TECHNICAL FIELD

This disclosure relates to a motor system in which a motor driver drives a plurality of motors.

BACKGROUND

Conventionally, a motor system in which electric power output by a motor driver is distributed to a plurality of motors in a time-slicing manner has been known. Japanese Patent Application Publication No. 2007-288964 discloses a motor system of this type.

In a motor driver disclosed in Japanese Patent Application Publication No. 2007-288964, a plurality of motors is connected to only one motor driver via a switching circuitry. The motor driver performs on-off control on six transistor to apply an appropriate voltage to each of drive coils of the U, V, and W phase included by each motor. Each transistor is driven by a driving method that uses a pulse signal generated by a pulse width modulation scheme. The plurality of motors is simultaneously driven with an appropriate operation of the switching circuitry.

When a plurality of motors is connected to only one motor driver as disclosed in Japanese Patent Application Publication No. 2007-288964, the switching circuit repeats an operation of connecting the motor driver to all motors in turns to drive all motors simultaneously. However, when the number of the motors is large, the electric power supplied per motor becomes small, making it difficult to generate strong torque in the motors.

In Japanese Patent Application Publication No. 2007-288964, the rotational speed or the rotational direction of the motors that are driven simultaneously cannot be controlled individually. We have newly discovered that when the number of the motors connected to the motor driver is large, the configuration for the control can be complicated.

It would therefore be helpful to achieve individual control with a simple configuration in a motor system in which one motor driver drives a plurality of motors while increasing electric power distributed to each motor.

SUMMARY

We thus provide a motor system that includes a plurality of motors, a motor driver, a switcher, an output controller, and a switching controller. The motor driver supplies electric power for generating driving force in the plurality of motors. The switcher selectively switches a target motor to which the electric power output from the motor driver is supplied among the plurality of motors. The output controller includes a plurality of motor controllers, each of which performs control on any one of the plurality of motors, and controls the motor driver so that the motor driver outputs the electric power based on an output from each of the plurality of motor controllers. The switching controller controls the switcher so that the target motor is cyclically switched among an equal or fewer number of motors out of the plurality of motors compared to a number of the plurality of motor controllers.

Accordingly, the plurality of motors can be individually controlled in the motor system in which one motor driver drives the plurality of motors. By setting the number of the motor controllers to be less than the number of the motors connected to the motor driver, the number of the motor controllers can be reduced and the configuration can be simplified. Also, by limiting the number of the motors that are driven simultaneously, the electronic power from the motor driver distributed to each motor can be increased.

It is preferable that the motor system includes a plurality of moving objects and a position detector. The position detector detects positions of the plurality of moving objects. The plurality of motors move the plurality of moving objects. The output controller allocates and deallocates any of the plurality of motor controllers to and from one motor selected from the plurality of motors based on a result of detection made by the position detector. The output controller controls the motor driver so that the motor driver outputs the electric power based on an output from one of the plurality of motor controllers which is allocated to any of the plurality of motors. The switching controller controls the switcher so that the target motor is cyclically switched among motors that are among the plurality of motors and are allocated the plurality of motor controllers and so that electric power that corresponds to an output from one of the plurality of motor controllers is output with respect to one of the plurality of motors to which the one of the plurality of motor controllers is allocated.

Accordingly, when the moving object moves across the plurality of motors, the motors that the motor controllers are allocated to can be changed based on the detection made by the position detector. Thus, the multiple motors can be operated in coordination.

It is preferable that each of the plurality of motor controllers includes a position controller that controls a position of any of the plurality of motors.

Accordingly, the positions of the plurality of motors can be controlled individually.

It is preferable that each of the plurality of motor controllers includes a speed controller that controls a speed of any of the plurality of motors.

Accordingly, the speeds of the plurality of motors can be controlled individually.

It is preferable that the speed controller is included by an apparatus separate from the motor driver.

In this manner, since a plurality of the speed controllers is included by the apparatus separate from the motor driver, there is no need to configure the motor driver to include a special structure. Therefore, it is easy to apply a general-purpose motor driver to drive one motor.

It is preferable to include a configuration as follows. That is, the motor driver includes a current controller that controls a current flow through any of the plurality of motors. An output from each speed controller of the plurality of motor controllers is input into the current controller while an output to be input being cyclically switched. In the current controller, control dependent on past data is disabled.

Accordingly, the past data related to one motor can be prevented from affecting the control on another motor. As a result, unintended operation of the motors can be prevented.

It is preferable that each of the plurality of motor controllers includes a current integrator. The current integrator integrates a deviation between a current command which is an output from one of the plurality of motor controllers and a current which flows through one of the plurality of motors which the one of the plurality of motor controllers controls. The motor driver adds up a proportional control output from the current controller and an input from the current integrator and outputs the electric power based on a result of addition.

Accordingly, since integrating control with respect to electric power that flows through each of the motors can be achieved, a steady-state deviation can be reduced. Since one current integrator is arranged for each motor controller, past data of current deviations related to one motor can be prevented from affecting the control on another motor.

BRIEF DESCRIPTION OF THE DRAWINGS

FIG. 3 is a block diagram of a motor system according to a variation.

DESCRIPTION OF THE REFERENCE NUMERALS

Figure 1:
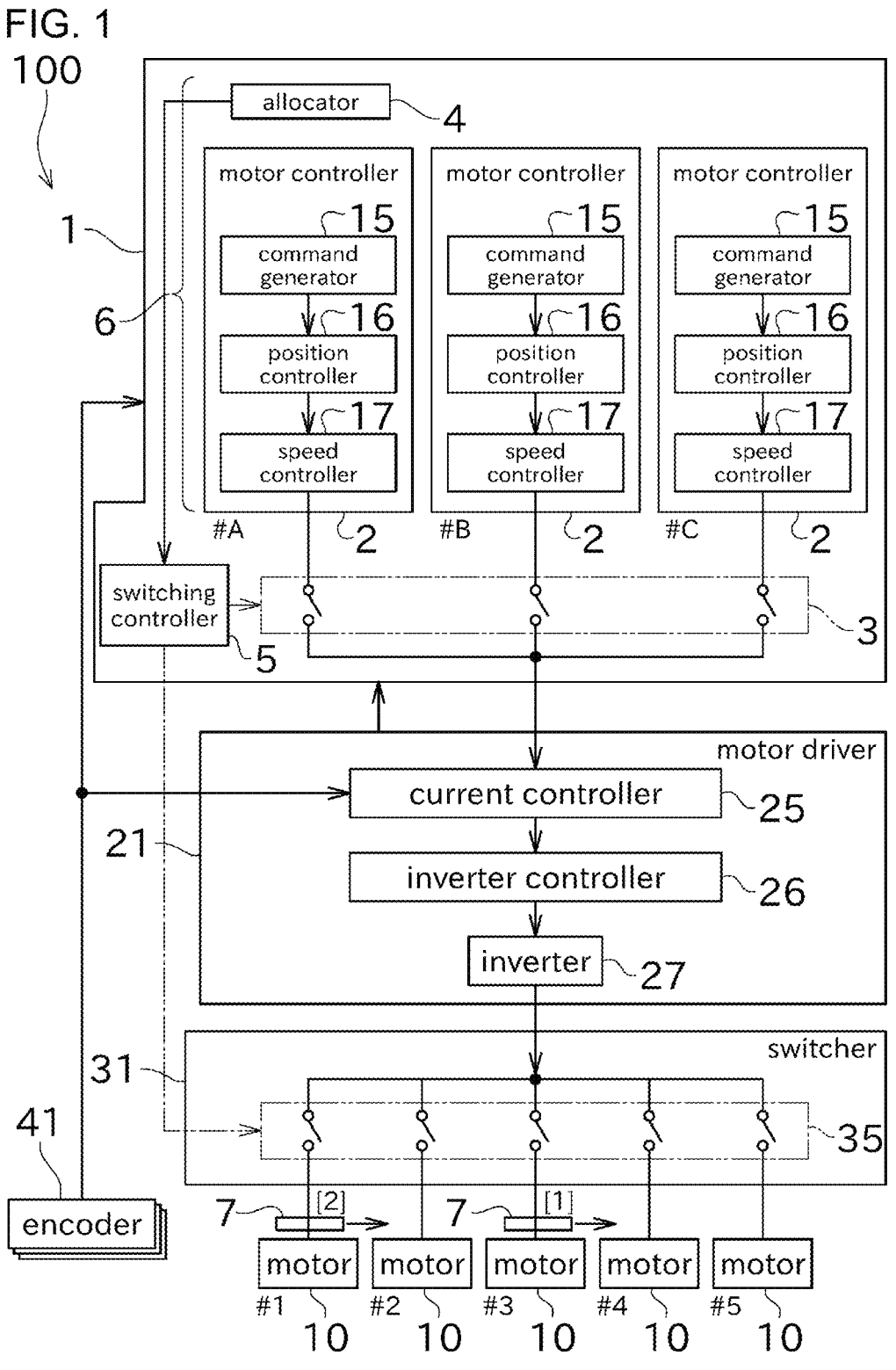
FIG. 1 is a block diagram of a motor system according to one example.

1 Controller
2 Motor controller
5 Switching controller
6 Output controller
7 Cart (moving object)
10 Motor
17 Speed controller
18 Current integrator
21, 21x Motor driver
25 Current controller
31 Switcher
41 Encoder (position detector)
100, 100x Motor system

DETAILED DESCRIPTION

Our system will be described below with reference to the drawings. FIG. 1 is a block diagram of a motor system 100.

The motor system 100 is a system for controlling a plurality of motors 10. The motor system 100 is applied to, for example, a transport system that drives a plurality of carts (moving objects) 7 to transport a stuff.

As shown in FIG. 1, the motor system 100 includes a controller 1, a motor driver 21, a switcher 31, a plurality of motors 10, and a plurality of encoders (position detectors) 41.

The controller 1 controls the plurality of motors 10 using the motor driver 21 and the switcher 31.

The controller 1 includes a plurality of motor controllers 2. FIG. 1 shows an example in which the controller 1 includes three motor controller 2. The number of the motor controllers 2 may be defined as desired as long as it is more than one.

The maximum number of the motors 10 that one motor controller 2 can control simultaneously (at one point in time) is one. In other words, one motor controller 2 cannot control more than one motor 10 at the same time. Since the controller 1 includes three motor controllers 2, the maximum number of the motors 10 that the controller 1 can control simultaneously (at one point in time) is three. Since the number of the motors 10 is five, the maximum number of the motors 10 that the controller 1 can control is fewer than the number of the motors 10.

The controller 1 includes a first selection switch 3, an allocator 4, and a switching controller 5.

The controller 1 is configured as, for example, a computer that includes a CPU, a ROM, a RAM, an auxiliary storage apparatus, or the like. The auxiliary storage apparatus is configured as, for example, a HDD, a SSD, or the like. Various programs or the like are stored in the auxiliary storage apparatus. Such collaboration of the hardware and the software as above enables the controller 1 to function as the first selection switch 3, the allocator 4, the switching controller 5, and the plurality of motor controllers 2.

The first selection switch 3 is configured, for example, as a software switch capable of fast switching. The first selection switch 3 is connected to output sides of the plurality of motor controllers 2.

The controller 1 and the motor driver 21 are communicably connected. The first selection switch 3 can let one output selected from outputs from the plurality of motor controllers 2 flow to the motor driver 21. The first selection switch 3 can switch which is to be input into the motor driver 21 among the outputs from the motor controllers 2.

The allocator 4 performs a process of allocating any one of the motor controllers 2 to each of the plurality of motors 10 and a process of deallocating. Since the allocation and the deallocation are performed dynamically, which of the motors 10 that the motor controller 2 is allocated to varies depending on the situation (for example, based on position detection data related to the cart 7 obtained by the encoder 41). Once the motor controller 2 is allocated to any of the motors 10, the motor controller 2 handles the control on the allocated motor 10 until this allocation is released.

An output controller 6 is comprised of the allocator 4 and the plurality of motor controllers 2. The output controller 6 controls the motor driver 21.

The switching controller 5 controls the first selection switch 3 so that it performs the switching repeatedly.

Suppose that all three motor controllers 2 are allocated to any of the motors 10. In this instance, the switching controller 5 controls the first selection switch 3 so that the outputs from the three motor controllers 2 are input into the motor driver 21 while the output to be input being cyclically switched every predetermined period of time.

When two of the three motor controllers 2 are allocated to the motors 10, the switching controller 5 controls the first selection switch 3 so that the outputs from the two motor controllers 2 are input into the motor driver 21 while the output to be input being cyclically switched every predetermined period of time.

The above-mentioned predetermined period of time is divided equally into three parts. Each of the three divided periods of time corresponds to each of the three motor controllers 2.

The number of the divided periods of time is 3 and is definite. Therefore, for example, when one of the three motor controllers 2 is not allocated to the motor 10, one third of the above-mentioned predetermined periods of time is an unoccupied time. However, the first selector switch 3 can also be controlled in such a way that the input into the motor driver 21 is switched only between the outputs from the motor controllers 2 allocated to the motors 10. This control can be achieved, for example, by dynamically changing how many times the time is divided and the above-mentioned predetermined period of time according to the number of the motor controllers 2 allocated to the motors 10.

The switching controller 5 outputs a switching signal for repeatedly switching a second selection switch 35 that the switcher 31 includes in conjunction with repeatedly switching the first selection switch 3 that the controller 1 includes. This will be described in detail later.

Next, the motor controllers 2 will be described below. Since the configurations of the plurality of motor controllers 2 are identical, one motor controller 2 will be described below as a representative. The motor controller 2 includes a command generator 15, a position controller 16, and a speed controller 17.

The command generator 15 generates a command related to a target position of a movable element of the motor 10. The target position is determined, for example, based on a signal from a higher-level computer which is not shown in the drawings. The command generator 15 outputs the position command to the position controller 16.

The position controller 16 controls the position of the movable element of the motor 10. As described in detail later, the position of the movable element that the motor 10 includes is detected by the encoder 41. The position controller 16 compares, for example, the current position of the movable element detected by the encoder 41 and the position command input from the command generator 15 and outputs a speed command according to a deviation between the positions to the speed controller 17.

The speed controller 17 controls the speed of the movable element of the motor 10. The speed controller 17 compares, for example, the current speed obtained based on the change in the position of the movable element detected by the encoder 41 and the speed command input from the position controller 16 and generates a current command according to a deviation between the speeds. The current command is a signal that indicates a current value. This current command corresponds to the output from the motor controller 2. As described in detail later, this current command is input into a current controller 25 that the motor driver 21 includes.

The motor driver 21 supplies electric power to the plurality of motors 10 and drives the motors 10. The motor driver 21 is, for example, a servo amplifier or an inverter.

The motor driver 21 includes the current controller 25, an inverter controller 26, and an inverter 27.

The current controller 25 controls the current flowing through the motors 10. The motor driver 21 includes a current sensor, which is not shown in the drawings, for detecting the current value which indicates a magnitude of the current that flows through the motors 10. The current sensor includes a known configuration in which a voltage according to the detected magnitude of the current is output. The current sensor may be arranged at, for example, the switcher 31, instead of at the motor driver 21.

The current controller 25 compares the detected current value and the current command input from the motor controllers 2 of the controller 1 (in other words, the speed controllers 17) and outputs a control signal according to a deviation between the currents. The control signal is a voltage signal that indicates a duty cycle in the PWM control performed by the inverter 27.

The inverter controller 26 controls the inverter 27 so that the inverter 27 generates a voltage according to the control signal. The control signal input from the current controller 25 into the inverter controller 26 is a command value for the known PWM control performed by the inverter 27. PWM stands for Pulse Width Modulation. The inverter controller 26 generates on/off signals for a switch element that the inverter 27 includes in such a way that the duty cycle according to the command value is realized. These signals are output from the inverter controller 26 into the inverter 27.

The inverter 27 includes a known inverter circuit. The inverter circuit includes a plurality of switch elements that is not shown in the drawings. With the switch elements being switched between on and off according to signals input from the inverter controller 26, the inverter 27 converts a DC voltage to an AC voltage. Each of the motors 10 is a three-phase motor. Correspondingly, the inverter 27 generates a three-phase AC voltage from a DC voltage. This AC voltage corresponds to an output from the motor driver 21. The motor driver 21 outputs the AC voltage to the switcher 31.

The switcher 31 selectively supplies the electric power that the motor driver 21 outputs to the plurality of the motor 10. The switcher 31 is configured as a circuit that includes the second selection switch 35.

The second selection switch 35 can supply a voltage waveform which is the output from the motor driver 21 to a selected motor 10 out of the plurality of motors 10. In addition, the second selection switch 35 can switch which of the motors 10 the output from the motor driver 21 is supplied to. The motor 10 to which the electric power from the motor driver 21 is supplied may be hereinafter referred to as a target motor.

At a certain moment, the target motor to which the electric power is supplied is only any one of the plurality of motors 10 connected to the switcher 31. The above-mentioned switching controller 5 controls the switcher 31 by a switching signal so that the switcher 31 repeats an operation of cyclically switching the target motor among a specific plurality of motors 10 at a high speed. Accordingly, the plurality of motors 10 can be driven substantially simultaneously.

The second selection switch 35 is controlled by the switching controller 5 so that it is switched simultaneously in conjunction with the first selection switch 3 being switched. Specifically, the switching controller 5 controls the second selection switch 35 so that, when one of the motor controllers 2 is selected by the first selection switch 3, the motor 10 allocated this motor controller 2 is selected as the target motor.

Consider a situation where each of the plurality of motor controllers 2 are allocated to any one of the motors 10 by the allocator 4 that the controller 1 includes. The current command output from the controller 1 to the motor driver 21 is that obtained by composing the current commands from the plurality of motor controllers 2 in a time-slicing manner by a cyclic switching operation of the first selection switch 3. Therefore, the voltage waveform output from the motor driver 21 to the switcher 31 corresponds to a composition obtained by composing voltage waveforms with respect to the plurality of motors 10 in a time-slicing manner. The second selection switch 35 that the switcher 31 includes separates the composed voltage waveform by a cyclic switching operation in conjunction with the first selection switch 3 and supplies it to the motor 10 that is allocated the motor controller 2.

The motor 10 will be described below. The motor 10 is configured as a three-phase motor. Each motor 10 includes a stationary element and the movable element.

The motor 10 is a linear motor in which the movable element performs a linear movement (a slide) with the stationary element.

The movable element of the linear motor includes a permanent magnet and the stationary element includes a coil. The movable element is attached to the cart 7 of the transport system. A plurality of the stationary element is arranged along the travel path of the cart 7. When the linear motor is a three-phase motor, the number of the coils that the stationary element of one motor 10 includes may be 3, 6, 9, or the like. Although FIG. 1 shows an instance where the number of the motors 10 is 5, within a linear motor system of the Primary-Side-on-Ground type, multiple stationary elements (in other words, the motors 10) are arranged side by side along the travel path of the cart 7.

As the electric power is supplied from the motor driver 21 to the coil of the motor 10, the coil becomes an electromagnet. Accordingly, a repulsive or attractive force acts between the stationary element and the movable element. As a result, the movable element moves relative to the stationary element.

The encoder 41 is arranged for each of the motors 10. The encoder 41 detects the operating state of the motor 10, more specifically, the relative displacement of the movable element with respect to the stationary element. The encoder 41 may be, for example, a magnetic sensor arranged on the travel path of the movable element. The magnetic sensor can detect the position of the movable element with respect to the stationary element.

A rotary motor in which the movable element (a rotary element, a rotor) performs a rotary movement with respect to the stationary element (a stator) may be used as the motor 10. If the motor 10 is a rotary motor, the encoder 41 may be configured as, for example, a known Hall element. The Hall element can detect the rotational angle of the movable element.

The encoder 41 is electrically connected to the controller 1. The controller 1 can output a signal that indicates the detected operating state of the motor 10 to the controller 1.

Next, the allocating process of the motor controllers 2 performed by the allocator 4 of the controller 1 and the switching operations by the first selection switch 3 and the second selection switch 35 will be described below.

In the following description, to identify each of the motors 10, they may be referred to with numbers, starting with the first motor 10 shown on the left in the FIG. 1 as the motor #1, the second one as the motor #2, . . . , and so on. As described above, the motor 10 is configured as a linear motor and the movable element moves as passing through the multiple stationary elements (coils). The number of the motor 10 can be considered, substantially, a number that identifies the stationary element.

Similarly, the encoders 41 may be referred to with numbers, like the encoder #1, the encoder #2, . . . , and so on. Each of the encoders 41 is arranged corresponding to the coil of each motor 10. The number of the encoder 41 corresponds to the number of the motor 10 (the stationary element).

Furthermore, to identify each of the motor controllers 2, they may be referred to with alphabets, starting with the first motor controller 2 shown on the left in FIG. 1 as the motor controller #A, the second one as the motor controller #B, . . . , and so on.

Figure 2:
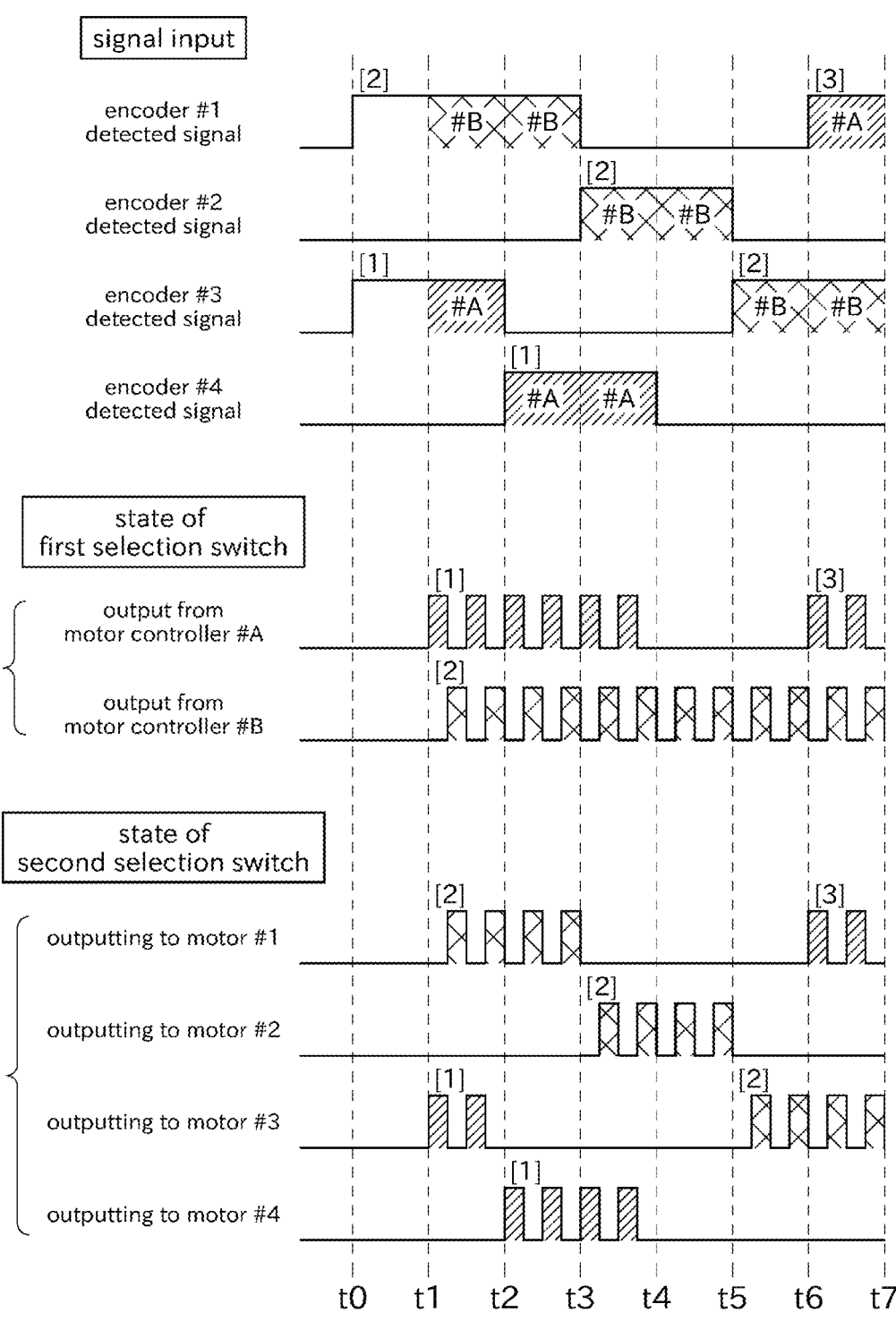
FIG. 2 is a chart showing how detection of a cart by an encoder changes outputs from a plurality of motor controllers and a state of a selection switch.

The following description is with reference to a graph shown in FIG. 2. FIG. 2 shows the changes in the output from the each of the motor controllers 2 with relation to the detection of the cart 7 by the encoders 41. FIG. 2 also shows the changes in the states of the first selection switch 3 and the second selection switch 35. In FIG. 2, a horizontal axis represents time. To simplify the description, FIG. 2 shows the example where the number of the motor controllers 2 is two and the number of the motors 10 (the number of the coils) is four.

At time t0, the encoders 41 are powered on. Suppose that the encoder #1 and the encoder #3 detect the carts 7 at this time.

When the cart 7 is detected, the allocator 4 allocates appropriate identification data to the cart 7 to identify each cart 7 detected. In the present example, the allocator 4 allocates an identification number "1" to the cart 7 detected by the encoder #3 and an identification number "2" to the cart 7 detected by the encoder #1. Hereafter, to identify these carts 7, they may be referred to with an identification number, like the cart [1] and the cart [2].

As described in detail later, the identification data of the cart 7 is used as a medium of the allocation of the motor controller 2 to the motor 10. It is sufficient if the identification data allocated to the cart 7 identify each of the carts 7 that are driven by the motor system 100 simultaneously. In other words, the identification data of the cart 7 does not have to be given in such a way that it can uniquely identify the carts 7 including ones that are not detected by the encoders 41.

Suppose that a command to make the two carts 7 detected by the encoders 41 travel is input from the higher-level computer to the controller 1 at time t1.

The allocator 4 immediately makes the motor controller #A correspond to the cart [1] and the motor controller #B to the cart [2]. Furthermore, the allocator 4 makes the encoder #3 correspond to the cart [1] and the encoder #1 to the cart [2]. All of these allocations are done on a one-to-one basis.

By the two allocations with the cart 7 as a medium, the allocation of the motor controller 2 to the motor 10 is achieved. Specifically, the motor controller #A is substantially allocated to the motor #3 to which the encoder #3 belongs with the cart [1] as a medium. Similarly, the motor controller #B is substantially allocated to the motor #1 to which the encoder #1 belongs with the cart [2] as a medium.

After time t1, the switching controller 5 makes the first selection switch 3 perform a switching operation so that the outputs from the motor controller #A and the motor controller #B are cyclically switched. Correspondingly, the switching controller 5 makes the second selection switch 35 perform a switching operation so that, when the output from the motor controller #A has been selected, the motor #3 is selected as the target motor and, when the output from the motor controller #B has been selected, the motor #1 is selected as the target motor.

In other words, the switching controller 5 selects the output from the motor controller 2 by the first selection switch 3 and, at the same time, selects the target into which the output from the motor driver 21 is input by the second selection switch 35, so that the output from the motor driver 21 is input into the coil of the motor 10 to which the selected motor controller 2 is allocated. The switching operations of the first selection switch 3 and the second selection switch 35 in conjunction with each other are repeated in a short period of time.

As a result, the cart [1] can be made travel by the motor #3 driven under the control by the motor controller #A and, simultaneously, the cart [2] can be made travel by the motor #1 driven under the control by the motor controller #B.

Since the motor controller #A and the motor controller #B are different, the position control, the speed control, or the like of each of the motor #3 and the motor #1 are performed independently from each other.

Suppose that, as a result of the travel of the cart [1], the encoder #3 ceases detecting the cart 7 and simultaneously the encoder #4 detects the cart 7 at time t2. In this instance, the allocator 4 deallocates the encoder #3 from the cart [1] and allocates the encoder #4 instead. Accordingly, the motor controller #A is deallocated from the motor #3 and it is allocated to the motor #4 instead.

As a result, after time t2, the cart [1] can be made travel by the motor #4 driven under the control by the motor controller #A and, simultaneously, the cart [2] can be made travel by the motor #1 driven under the control by the motor controller #B.

Next, suppose that, as a result of the travel of the cart [2], the encoder #1 ceases detecting the cart 7 and simultaneously the encoder #2 detects the cart 7 at time t3. In this instance, the allocator 4 deallocates the encoder #1 from the cart [2] and allocates the encoder #2 instead. Accordingly, the motor controller #B is deallocated from the motor #1 and it is allocated to the motor #2 instead.

As a result, after time t3, the cart [1] can be made travel by the motor #4 driven under the control by the motor controller #A and, simultaneously, the cart [2] can be made travel by the motor #2 driven under the control by the motor controller #B.

Next, suppose that, as a result of the travel of the cart [1], the encoder #4 ceases detecting the cart 7 at time t4. The cause of this may be, for example, that the cart 7 has got out of the purview where the traveling range of the cart 7 is divided into multiple areas and they are shared by multiple motor systems 100. In this instance, the allocator 4 deallocated the encoder #4 from the cart [1] and the motor controller #A from the cart [1]. Accordingly, the motor controller #A is deallocated from the motor #1. The motor controller #A, which has lost its target to control, stops controlling.

As a result, after time t4, the switching controller 5 operates the first selection switch 3 so that only the motor controller #B outputs. Correspondingly, the switching controller 5 operates the second selection switch 35 so that only the motor #2, to which the motor controller #B is allocated, is selected as the target motor.

Therefore, after time t4, the cart [2] can be made travel by the motor #2 driven under the control by the motor controller #B.

Next, suppose that, as a result of the travel of the cart [2], the encoder #2 ceases detecting the cart 7 and simultaneously the encoder #3 detects the cart 7 at time t5. In this instance, in the substantially same way as described above with respect to time t2, the allocator 4 deallocates the encoder #2 from the cart [2] and allocates the encoder #3 instead. Accordingly, the motor controller #B is deallocated from the motor #2 and is allocated to the motor #3 instead.

As a result, after time t5, the cart [2] can be made travel by the motor #3 driven under the control by the motor controller #B.

Next, suppose that the encoder #1 newly detects the cart 7 at time t6 as a result of the cart 7 travelling from an area outside of the purview, for example.

When the cart 7 is detected, the allocator 4 allocates identification data to it to identify the detected cart 7. FIG. 2 shows an example where an identification number "3" is allocated to this cart 7.

The allocator 4 then allocates the motor controller #A that has stopped since time t4 to the cart [3]. Furthermore, the allocator 4 allocates the encoder #1 to the cart [3]. As a result, the motor controller #A is allocated to the motor #1.

After time t6, the switching controller 5 makes the first selection switch 3 perform a switching operation so that the outputs from the motor controller #A and the motor controller #B are cyclically switched. Correspondingly, the switching controller 5 makes the second selection switch 35 perform a switching operation so that, when the output from the motor controller #A has been selected, the motor #1 is selected as the target motor and, when the output from the motor controller #B has been selected, the motor #3 is selected as the target motor.

As a result, the cart [3] can be made travel by the motor #1 driven under the control by the motor controller #A and simultaneously the cart [2] can be made travel by the motor #3 driven under the control by the motor controller #B.

For example, in a linear motor system of the Primary-Side-on-Ground type, a number of coils of stationary elements (in other words, the motors 10) may reach into several hundreds. It is technically possible to configure the controller 1 so that it includes several hundreds of motor controllers 2 corresponding to this. However, in this instance, the amount of the electric power distributed to one motor would be divided into several hundreds, making it difficult to generate a strong thrust force in the coil. In addition, the configuration with many motor controllers 2 requires high computer performance of the controller 1, which causes hardware costs to increase.

In this regard, the motor system 100 includes a configuration where the maximum of the number of the motors 10 that can be controlled and driven simultaneously (in other words, a number of the carts 7) is defined and the controller 1 includes an equal number of the motor controllers 2 as this maximum number. Therefore, a larger amount of the electric power is available per motor 10. Also, by limiting the number of the motor controllers 2, the hardware resources can be saved. As a result, the costs for the system can be controlled.

In a linear motor system, each of the carts 7 travels in such a way that it passes over the coils that the plurality of motors 10 include one after another. To achieve this, the motor 10 that drives the cart 7 is switched one after another. The switching of control such that the cart 7 passes over the motors 10 is performed based on a known algorithm. The cyclic switching of the outputs from the motor controllers 2 and the dynamic changing of the allocation of the motor controllers 2 are combined with each other. It can be said that this configuration is highly compatible with a motor transfer algorithm for a moving object that an existing linear motor system of the Primary-Side-on-Ground type includes.

The motor driver 21 may be varied so that it includes the same number of the current controllers 25 as the number of the motor controllers 2. This variation will be described below with reference to FIG. 3. In the description of the present variation, components identical or similar to those of the above-described example may be marked with the same reference signs in the drawings and the description thereof may be omitted. The same applies to an example of a configuration in FIG. 4 described below.

In a motor system 100x according to the variation in FIG. 3, a motor driver 21x includes three current controllers 25. The output from each of motor controllers 2 is input into the corresponding current controller 25. To channel the outputs from the plurality of current controllers 25 to an inverter controller 26, a first selection switch 3 is included by the motor driver 21x instead of at a controller 1.

Similar to the configuration in FIG. 1, the motor system 100x of the present variation can achieve efficient usage of electric power by limiting a number of carts 7 that are driven simultaneously. In the present variation, the current controllers 25 are arranged corresponding to each of the plurality of motor controllers 2, enhancing the control performance on motors 10 compared to the configuration in FIG. 1. On the other hand, the present variation requires a special configuration on the side of the motor driver 21 for including more than one current controller 25 and also selecting the outputs from them. Therefore, it is difficult to use a widely used general-purpose motor driver as the motor driver 21.

In this regard, in the configuration in FIG. 1, one current controller 25 that the motor driver 21 includes operates with respect to all the controls on the plurality of motors 10. Therefore, the general-purpose motor driver 21 that is capable of controlling one motor can be used in the motor system 100 as it is.

In the example shown in FIG. 1, a composition obtained by composing the outputs from the plurality of speed controllers 17 in a time-division manner is input with respect to one current controller 25. Usually, the control law of the current controller 25 includes a derivative term and an integral term. If such a control that depends on past data is included, the control on one motor 10 will be affected by past data related to another motor 10. Therefore, the current controller 25 is so configured that it performs only proportional control and not derivative or integral control. This configuration can be achieved by setting the motor driver 21 so that the derivative term and the integral term is substantially disabled when the general-purpose motor driver 21 is operated in a current controlling mode.

If the current controller 25 does not perform the integral control, a steady-state deviation remains in the current control. Therefore, as shown in the example of the configuration in FIG. 4, a current integrator 18 may be arranged at each of the motor controllers 2 in the controller 1.

Figure 4:
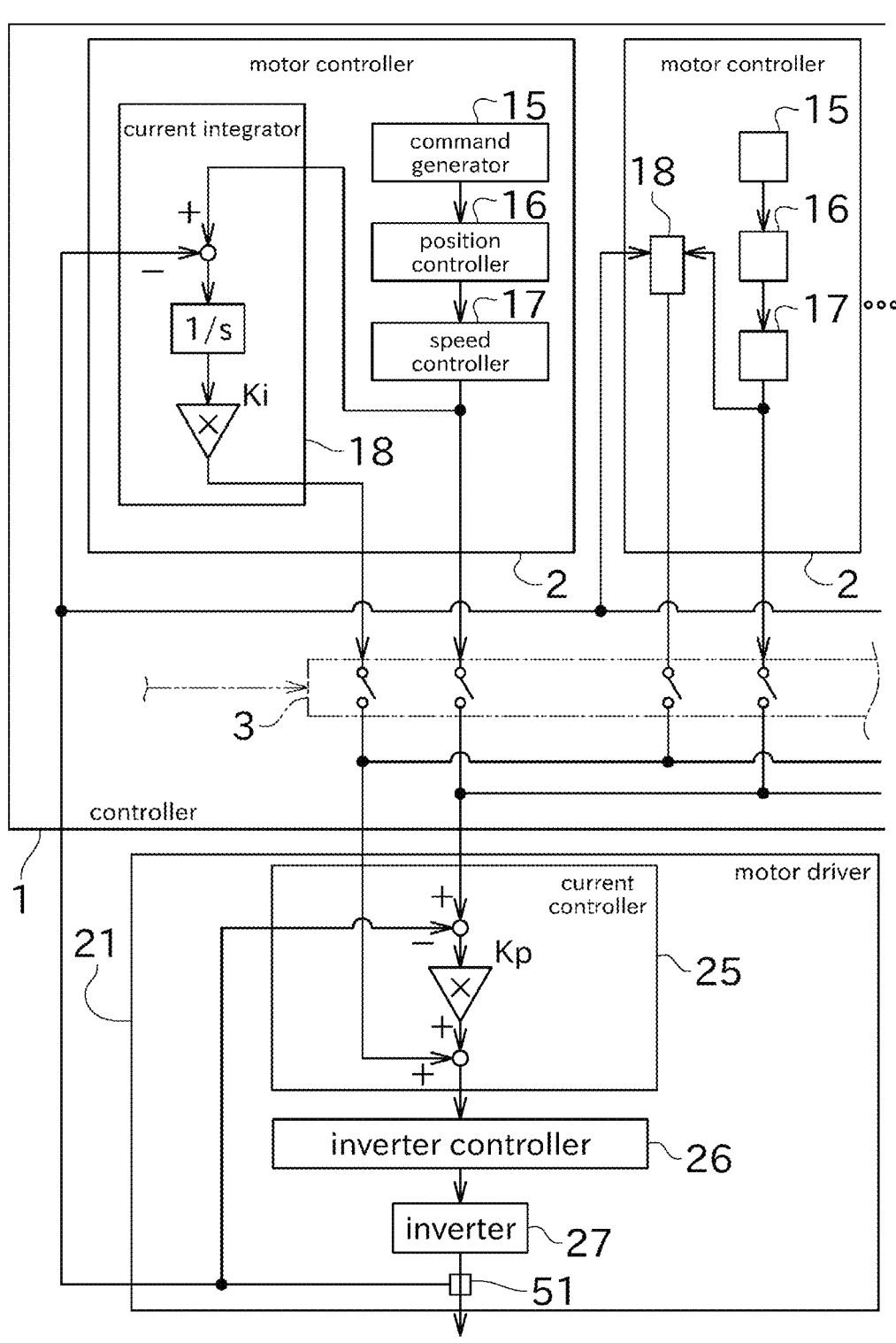
FIG. 4 is a block diagram showing an example of a configuration in which each motor controller includes a current integrator.

The current integrator 18 calculates a current deviation by subtracting the current value detected by the motor driver 21 from the current command that is the output from the speed controller 17. The current value can be obtained by a current sensor 51 that is arranged at the side to which the inverter 27 outputs, as shown in FIG. 4. The obtained current deviation is input to an integrator. The current integrator 18 outputs a voltage value that corresponds to a result of multiplying an output from the integrator by an appropriate gain Ki.

The output from the current integrator 18 is input to the first selection switch 3. When the first switch 3 operates so that the output from the selected motor controller 2 is input to the motor driver 21, it simultaneously operates in such a way that the outputs from the current integrator 18 that the selected motor controller 2 includes is also input to the motor driver 21.

The current controller 25 of the motor driver 21 performs only the proportional control, as described above, based on the current command output from the speed controller 17 of the motor controller 2. However, in the current controller 25, a voltage value output from the current integrator 18 is added to a voltage value that corresponds to an amount of operation that a proportional controller outputs.

The current controller 25 calculates a current deviation by subtracting the current value detected by the motor driver 21 from the current command that is the output from the speed controller 17. After multiplying the obtained current deviation by an appropriate gain Kp, the current controller 25 adds the voltage input from the current integrator 18 to it. The current controller 25 outputs the voltage obtained as above to the inverter controller 26 as a control signal.

In the above-described manner, the problem of remaining the steady-state deviation can be solved. Since the current integrators 18 is arranged per motor controller 2, the control on one motor 10 will not be affected by the past data related to the other motors 10. Furthermore, since the current integrator 18 is arranged at the controller 1, regarding the motor driver 21, only a simple modification on the general-purpose motor driver 21 of adding a configuration for adding the voltage value is required. In other words, since the configuration requires only a modification of adding an integral term, a parameter associated with the integral calculation (for example, a gain and a control cycle), resetting of the integral value, and management of a limit, for example, are all unnecessary. Therefore, it is easy to apply the general-purpose motor driver 21.

As described above, the motor system 100 includes the plurality of motors 10, the motor driver 21, the switcher 31, the output controller 6, and the switching controller 5. The motor driver 21 supplies the electric power for generating driving force in the plurality of motors 10. The switcher 31 selectively switches the target motor to which the electric power output from the motor driver 21 is supplied among the plurality of motors 10. The output controller 6 includes the plurality of motor controllers 2, each of which performs control on any one of the plurality of motors 10, and controls the motor driver 21 so that the motor driver 21 outputs the electric power based on the output from each of the plurality of motor controllers 2. The switching controller 5 controls the switcher 31 so that the target motor is cyclically switched among an equal or fewer number of motors 10 out of the plurality of motors 10 compared to the number of the plurality of motor controllers 2.

Accordingly, the plurality of motors 10 can be individually controlled by one motor driver 21. By setting the number of the motor controllers 2 less than the number of the motors 10 connected to the motor driver 21, the number of the motor controllers 2 can be reduced and the configuration can be simplified. Also, by limiting the number of the motors 10 that are driven simultaneously, the electric power from the motor driver 21 distributed to each motor can be increased.

The motor system 100 includes a plurality of carts 7 and an encoder 41. The encoder 41 detects the positions of the plurality of carts 7. The plurality of motors 10 move the plurality of carts 7. The allocator 4 that the output controller 6 includes allocates and deallocates any of the plurality of motor controllers 2 to and from one motor 10 selected from the plurality of motors 10 based on the results of detection made by the encoder 41. The output controller 6 controls the motor driver 21 so that the motor driver 21 outputs the electric power based on the output from one of the plurality of motor controllers 2 which is allocated to any of the plurality of the motors 10. The switching controller 5 controls the switcher 31 so that the target motor is cyclically switched among the motors 10 that are among the plurality of the motors 10 and are allocated the plurality of motor controllers 2 and so that the electric power that corresponds to the output from one of the plurality of motor controllers 2 is output with respect to one of the plurality of motors 10 to which the one of the plurality of motor controllers 2 is allocated.

Accordingly, when the cart 7 moves across the plurality of motors 10, the motors 10 that the motor controllers 2 are allocated to can be changed based on the detection made by the encoder 41. Thus, the plurality of motors 10 can be operated in coordination. This configuration is especially suitable for a linear motor system of a Primary-Side-on-Ground type.

In the motor system 100, each of the plurality of motor controllers 2 includes the position controller 16 that controls the position of any of the plurality of motors 10.

Accordingly, the positions of the plurality of motors 10 can be controlled individually.

In the motor system 100, each of the plurality of motor controllers 2 includes the speed controller 17 that controls the speed of any of the plurality of motors 10.

Accordingly, the speeds of the plurality of motors 10 can be controlled individually.

In the motor system 100, the speed controller 17 is included by the controller 1 which is an apparatus separate from the motor driver 21.

In this manner, since the plurality of speed controllers 17 is included by the apparatus separate from the motor driver 21, there is no need to configure the motor driver 21 to include a special structure. Therefore, it is easy to apply a general-purpose motor driver to drive one motor.

In the motor system 100, the motor driver 21 includes the current controller 25 that controls the current flows through any of the plurality of motors 10, as shown in FIG. 1. An output from each speed controller 17 of the plurality of motor controllers 2 is input into the current controller 25 while the output to be input being cyclically switched. In the current controller 25, control dependent on the past data is disabled.

Accordingly, the past data related to one motor 10 can be prevented from affecting the control on another motor 10. As a result, unintended operation of the motors 10 can be prevented.

In the motor system 100 according to the example of the configuration shown in FIG. 4, each of the plurality of motor controllers 2 includes the current integrator 18. The current integrator 18 integrates a deviation between a current command which is an output from one of the plurality of motor controllers 2 and a current which flows through one of the plurality of motors 10 which the one of the plurality of motor controllers 2 controls. The motor driver 21 adds up a proportional control output from the current controller 25 and an input from the current integrator 18 and outputs the electric power based on a result of addition.

Accordingly, since integrating control with respect to electric power that flows through each of the motors 10 can be achieved, a steady-state deviation can be reduced. Since the current integrator 18 is arranged for each motor controller 2, the past data of current deviations related to one motor 10 can be prevented from affecting the control on another motor 10. Since the current integrator 18 is arranged at a hardware separate from the motor driver 21 (for example, at the controller 1), there is no need to configure the motor driver 21 to include a special structure.

Although the preferred example has been described above, the above-described configuration can be modified, for example, as follows. Such a modification may be made singularly or made in combination with any other modification.

The number of the motors 10 connected to one motor driver 21 or 21x may be determined as desired. The same applies to the number of the motor controllers 2 that the controller 1 includes.

At least one of the allocator 4 or the switching controller 5 may be modified so that it is included by the motor driver 21 or the switcher 31.

The encoder 41 may be configured so that it outputs the data of the detected position of the movable element via the switcher 31 and the motor driver 21 to the controller 1. In this instance, the connection between the encoder 41 and the controller 1 can be simplified.

The allocator 4 may directly allocate the motor controller 2 to the motor 10 without the cart 7 intervening.

The motor controller 2 that includes the speed controller 17 may be included by the same apparatus as the motor driver 21.

The position controller 16 may be included in the same apparatus as the motor driver 21.

A motor driver that includes a special configuration, such as a modified motor driver, may be used as the motor drivers 21 and 21x.

The motor driver 21 and the switcher 31 may be realized in physically separate apparatuses or may be realized in one apparatus.

A 2-phase motor may be used as the motor 10 instead of a 3-phase motor.

Each of the motors 10 may be a rotary motor. For example, our system may be applied to a configuration in which rotary rollers are arranged side by side in a roller conveyor and each rotary roller is driven by a rotary motor.

The motor systems 100 and 100x may be applied to an appropriate system other than the transport system.

From the above-described example and the variations thereof, at least following technical ideas can be grasped.

(Item 1) A motor system comprising:
a plurality of motors;
a motor driver that generates and outputs a drive waveform to make the plurality of motors generate a driving force by PWM control; and
a switcher for selectively switching a target motor, to which electric power output by the motor driver is supplied, among the plurality of motors, wherein
the switcher is controlled by a switching controller so that the target motor is cyclically switched among the plurality of the motors,
a carrier cycle of the PWM control includes a high-level period during which PWM output is high level and a low-level period during which the PWM output is low level, and
the switching controller controls the switcher so that the switcher switches the target motor during the low-level period.

(Item 2) The motor system according to item 1, wherein the switching controller controls the switcher so that switcher switches the target motor at a timing where a phase of the carrier cycle differs by 180° with respect to a central timing of the high-level period.

(Item 3) The motor system according to item 1 or 2, wherein the switching controller controls the switcher so that the target motor is switched at each predetermined switching cycle, and the carrier cycle of the PWM control and the switching cycle are synchronized.

(Item 4) The motor system according to any one of items 1 to 3, comprising a voltage detector detecting a voltage output from the motor driver, wherein the switching controller determines a switching timing included in the low-level period based on a detection result of the voltage detector, and controls the switcher so that the switcher switches the target motor at the switching timing.

(Item 5) The motor system according to item 4, wherein each of the plurality of motors includes coils corresponding to a plurality of phases,
the motor driver performs the PWM control for each of the coils of the plurality of phases, the switching controller determines a central timing of
the past high-level period of the PWM output for at
least one of the plurality of phases, and
the switching controller determines the switching tim-
ing based on the central timing.
(Item 6) The motor system according to item 5, wherein
the switching controller determines a central timing of
the past high-level period of the PWM output for two
or more of the plurality of phases, and
the switching controller determines the switching timing based on the central timings determined for two
or more phases.
(Item 7) The motor system according to any one of items
1 to 6, wherein
each of the plurality of motors includes coils corresponding to a plurality of phases,
the motor driver performs the PWM control for each of
the coils of the plurality of phases, and
the switching controller controls the switcher so that
the switcher switches the target motor during a
period when the PWM output is low level for all of
the plurality of phases.
The invention claimed is:
1. A motor system, comprising:
a plurality of motors;
a motor driver that supplies electric power to make the
plurality of motors generate driving force;
a switcher that selectively switches a target motor to
which the electric power output from the motor driver
is supplied among the plurality of motors;
an output controller that includes a plurality of motor
controllers, each of which performs control on any one
of the plurality of motors, and controls the motor driver
so that the motor driver outputs the electric power
based on an output from each of the plurality of motor
controllers; and
a switching controller that controls the switcher so that the
target motor is cyclically switched among an equal or
fewer number of motors out of the plurality of motors
compared to a number of the plurality of motor controllers.
2. The motor system according to claim 1, comprising:
a plurality of moving objects; and
a position detector that detects positions of the plurality of
moving objects,
wherein the plurality of motors move the plurality of
moving objects, and
wherein the output controller allocates and deallocates
any of the plurality of motor controllers to and from one motor selected from the plurality of motors based on a
result of detection made by the position detector, and
wherein the output controller controls the motor driver so
that the motor driver outputs the electric power based
on an output from one of the plurality of motor con-
trollers which is allocated to any of the plurality of
motors, and
wherein the switching controller controls the switcher so
that the target motor is cyclically switched among
motors that are among the plurality of motors and are
allocated the plurality of motor controllers and so that
electric power that corresponds to an output from one
of the plurality of motor controllers is output with
respect to one of the plurality of motors to which the
one of the plurality of motor controllers is allocated.
3. The motor system according to claim 1, wherein each
of the plurality of motor controllers includes a position
controller that controls a position of any of the plurality of
motors.
4. The motor system according to claim 1, wherein each
of the plurality of motor controllers includes a speed con-
troller that controls a speed of any of the plurality of motors.
5. The motor system according to claim 4, wherein the
speed controller is included by an apparatus separate from
the motor driver.
6. The motor system according to claim 4, wherein the
motor driver includes a current controller that controls a
current flows through any of the plurality of motors, and
wherein an output from each speed controller of the
plurality of motor controllers is input into the current
controller while an output to be input being cyclically
switched, and
wherein, in the current controller, control dependent on
past data is disabled.
7. The motor system according to claim 6, wherein each
of the plurality of motor controllers includes a current
integrator, and
wherein the current integrator integrates a deviation
between a current command which is an output from
one of the plurality of motor controllers and a current
which flows through one of the plurality of motors
which the one of the plurality of motor controllers
controls, and
wherein the motor driver adds up a proportional control
output from the current controller and an input from the
current integrator and the motor driver is controlled so
that the motor driver outputs the electric power based
on a result of addition.

* * * * *